Figure 1:
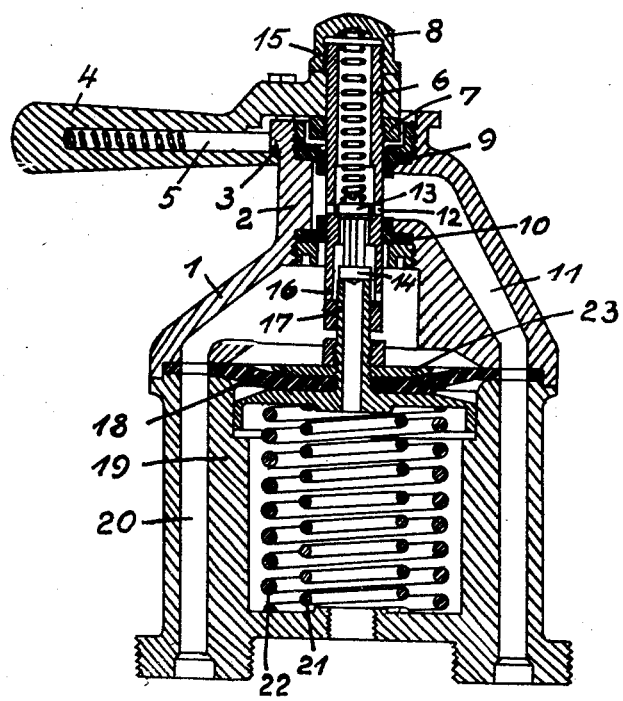

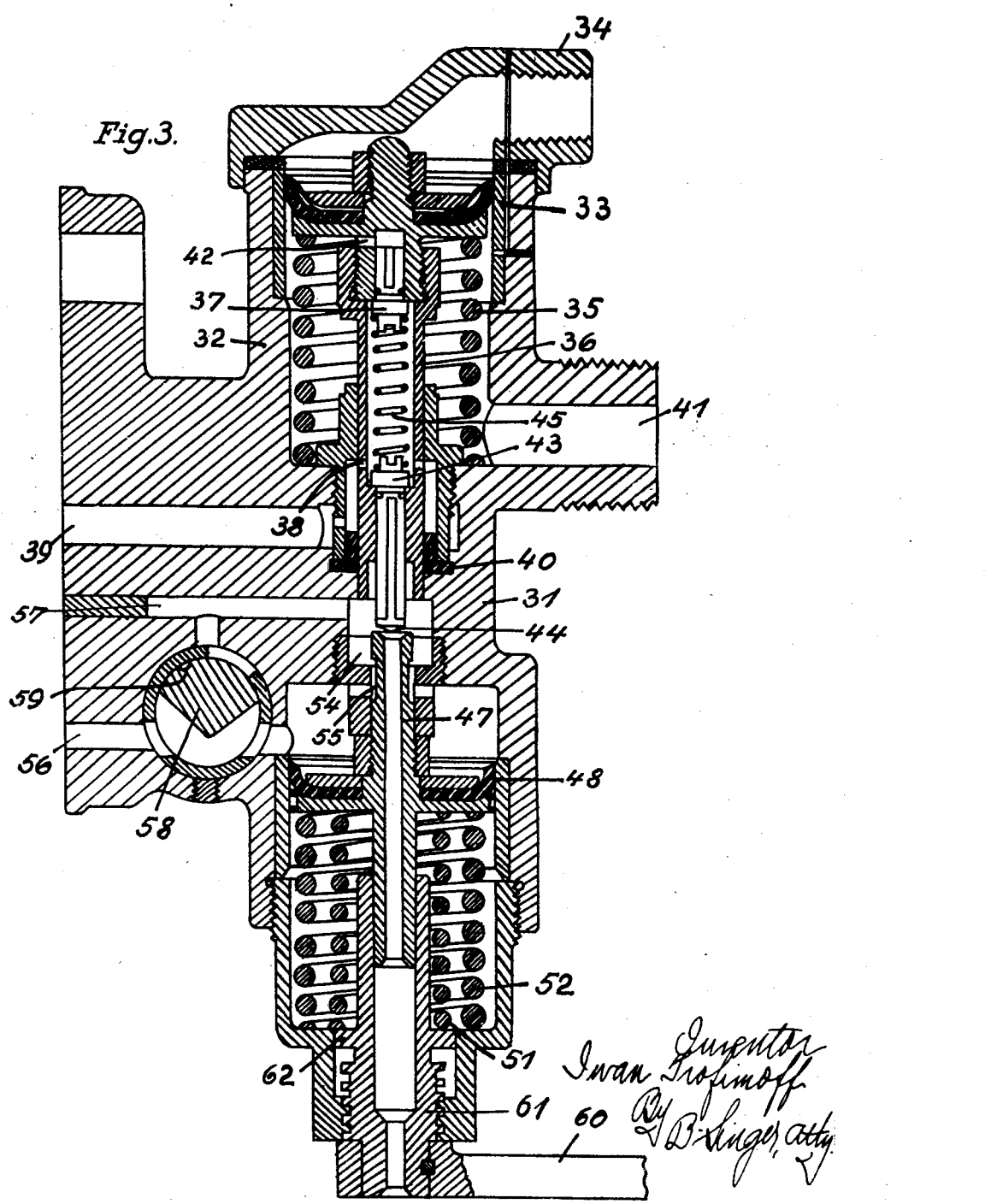

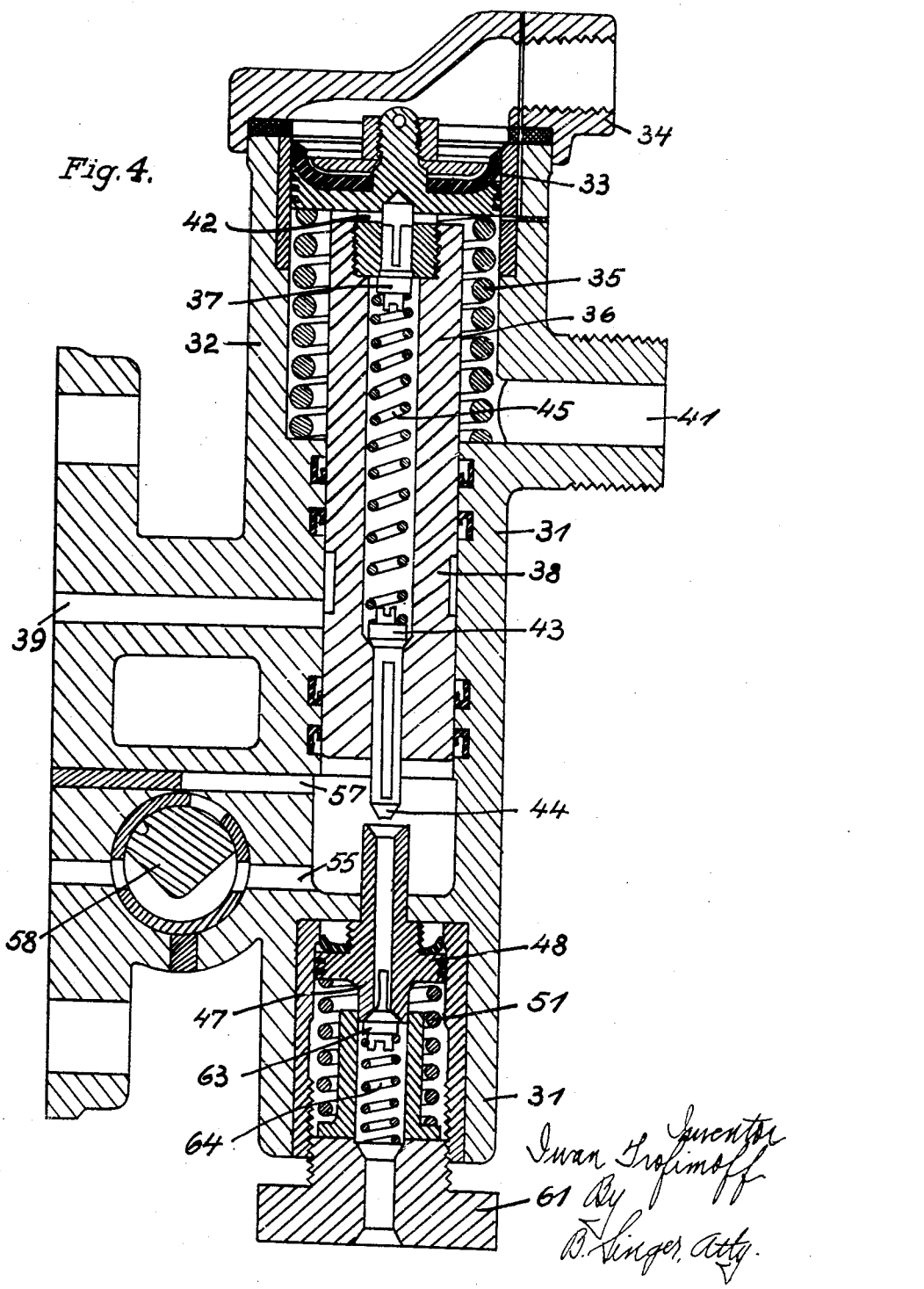

Patented July 3, 1928.

1,675,962

UNITED STATES PATENT OFFICE.

IWAN TROFIMOFF, OF MOSCOW, RUSSIA.

ONE-LINE BRAKE.

Application filed June 2, 1927, Serial No. 196,067, and in Russia June 15, 1926.

The invention relates to an air brake of the known one line type for use in railways or motor car trains.

The new feature in regard to the leaders valve consists therein that a leaders handle, fitted in a known way movably on a screw like part, is provided with a hollow spindle, containing a double valve, one cone of which governs an air inlet to a brake pipe chamber, the other cone governing an atmospheric outlet against a seat, influenced by the brake air pressure and a spring. The new leaders valve is simple and sure in action and allows the use of any desirable grades of governing air pressures in the brake pipe. Further advantageous features of the new leaders valve will be described below.

The new ruling valve or distributor, consisting essentially of similar parts, is advantageously provided with a piston like member, corresponding to the governing member of the leaders valve, one side of said piston like member being loaded by the air pressure of an equal pressure reservoir, the other side by a spring, and provided with a hollow spindle with a double valve, one cone of which governs an air inlet from the brake pipe to an auxiliary air reservoir and from these both parts to a brake cylinder, the other cone governing an atmospheric outlet against a seat, provided on a piston like member, corresponding to the piston like member of the leaders valve, and loaded on one side by the brake cylinder pressure, on the other side by a spring. By the use of simple and almost similar in action details for the essential parts of the brake also a very simple and surely acting ruling valve is produced, which answers to the smallest pressure grades in the brake pipe and produces correspondingly small grades of the braking action. Further features of the ruling valve will be described below.

Figure 2:
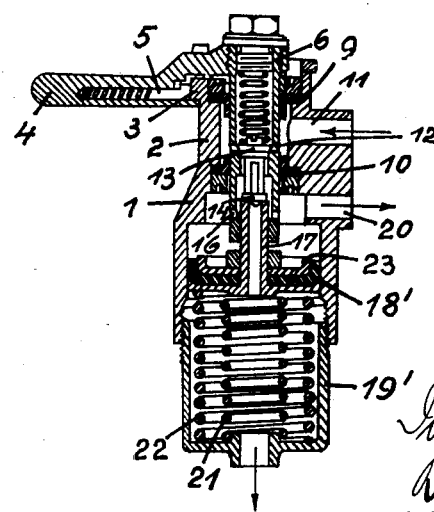

The drawing shows the principal parts of the new brake,

Figs. 1 and 2 showing two types of the leaders valve,

Figs. 3 and 4 two types of the ruling valve.

A casing 1 of the leaders valve is provided on its narrower part 2 with a screw like collar 3. A leaders handle 4 is movable on the collar, being held on it by a ratchet bar 5 so, that during turning the handle moves upwards. The handle is provided with a hollow spindle 6, which is fixed by a nut 7 and a lock-nut 8. The spindle extends through packing rings 9 and 10 in the upper and lower end of the casing part 2 so, that a chamber is formed to which is connected a channel 11 from a principal air reservoir.

The hollow spindle 6 is provided inside of said chamber with borings 12, directly below which a valve seat is provided for the upper cone 13 of a double valve 13, 14, the cone 13 being pressed upon its seat by a spring 15. The lower part of the hollow spindle 6 is provided with borings 16 and is guided by an atmospheric outlet 17, attached to a diaphragm 18. The diaphragm 18 is put between the casing 1 and a lower casing part 19 and forms with the casing 1 a chamber, into which is led a channel 20 from the brake pipe. Two springs 21 and 22 load the diaphragm against the pressure in the chamber. A stop plate 23 with a spring hold the diaphragm against the casing at lowest pressure in the chamber.

The new device acts as follows. At the highest position of the leaders handle with the hollow spindle the atmospheric outlet 17 is stopped by the plate 23, the cone 14 of the double valve not closing the outlet, the upper cone 13 being on its seat. The brake pipe is then connected to the atmosphere, which corresponds to the strongest braking action.

At the lowest position of the hollow spindle the cone 14 closes the atmospheric outlet 17, the cone 13 being open, and the valve follows the movement of the atmospheric outlet 17, till the air, streaming to the brake pipe through the channels and borings 11, 12, 13, 16 and 20, reaches the highest pressure, and the diaphragm 18 with the atmospheric outlet 17 is suspended in a balanced state, which corresponds to the filling of the brake pipe.

In all intermediate positions the diaphragm 18 always comes into a balanced state between the force of the springs 21, 22 on one side and the brake pipe and pipe pressure on the other side, as the double valve is closed at its both cones only at a certain position of the diaphragm, corresponding exactly to the position of the hollow spindle 6, and at a change of this position to one or the other side admits or lets out air to or from the brake pipe. Each air pressure remains hereby automatically maintained.

The leaders valve according to Fig. 2 corresponds to that according to Fig. 1 and all parts have received the same numerals. The only difference consists therein, that instead of a diaphragm a piston 18' with a leather packing ring is provided. The lower casing part 19' is further arranged movably in regard to the upper casing part 1 with the purpose to regulate the tension of the springs 21, 22, and the channels 11 and 12 are provided directly in the upper casing part. The action also corresponds to that of the firstly described leaders valve.

The ruling valve according to Fig. 3 consists principally of the same parts, as the leaders valve, i. e. of a governing device and an acting device, with the only difference, that the governing device instead of being regulated by the leaders handle is regulated automatically by an air pressure difference.

A casing 31 contains in its narrower part 32 a hollow spindle 36, which extends downwards through a packing ring 40 and is provided in its upper end with borings 42 and encloses a double valve with two cones 43, 44 with springs. The lower cone 44 stands opposite an atmospheric outlet 47, attached to a piston 48 with springs 51, 52.

The hollow spindle 36 is attached to a piston 33 with a leather packing ring. Above the piston the casing part 32 is provided with a junction 34 to an equal pressure air reservoir so, that the piston is loaded on its upper side by a constant air pressure. On its lower side the piston is loaded by a spring 35. The borings 42 of the hollow spindle are closed against a back stream of the air by a valve 37, placed inside the hollow spindle. Further borings 38 connect the space inside the spindle between the valves with a channel 39, which is connected with the auxiliary air reservoir. A junction 41 serves for connection of the brake pipe with the casing part 32.

A chamber 54 contains the cone 44 of the double valve, which leads to the atmosphere, and is connected by a channel 55 to a channel 56, which leads to the brake cylinder. A further channel 57 leads to the brake cylinder channel 56. In the way of these two channels is provided a cock 58, which closes the narrow channels 54, 55 or the wide channel 57, or connects them fully or partly throttled with the brake cylinder channel 56, or closes the channel 56. In the last mentioned position an atmospheric outlet 59 is situated in the channel 56 and connects it with the atmosphere. The brake is hereby put out of action, while the use of the narrow channels 54, 55 results in a slow braking; and the use of the wide channel 57 results in quick braking.

A regulating member 60 with a screw like fixing part 61 and a spring plate 62, loaded by an inner spring 51 is provided in the lower casing part. The spring 51 can be brought hereby to any desired tension, according to the regulating of a more or less strong braking action.

The device acts as follows: The air streams to the junction 41 of the brake pipe and presses the piston 33 in direction to the equal pressure reservoir junction 34. The piston is then suspended in a certain balanced state, corresponding to each pressure fall in the brake pipe. The air streams also through the nonreturn valve 37 into the hollow spindle 36 and through the borings 38 to the junction 39 of the auxiliary air reservoir, which is hereby filled to the highest pressure of the brake pipe. The upper cone 43 of the double valve remains closed so, that the brake pipe and the auxiliary air reservoir are separated from the brake cylinder. If the pressure in the brake pipe sinks, for example, from 5 to 3.5 atmospheres, the piston 33 with the hollow spindle 36 goes down so, that the lower cone 44 of the double valve closes the atmospheric outlet and the upper cone 43 admits pressed air into the brake cylinder, and the braking action begins. This air admission results in a pressure rise above the lower piston 48 so, that the piston goes downwards and the air admission lasts only as long, as the upper piston follows that downward movement. At its end the upper cone 43 of the double valve comes on its seat and closes the air admission from the brake pipe and the auxiliary air reservoir, and eventually the lower cone 44 lets out pressed air from the brake cylinder to an extent, that the lower piston 48 moves upwards and closes again the cone 44 of the double valve. In this manner each air pressure in the brake pipe corresponds to a certain air pressure in the brake cylinder, and this brake cylinder pressure is automatically maintained constant by filling up from the auxiliary air reservoir into the brake pipe, if air losses arise from untightness.

The air pressure is regulated by the lower handle 60 by the tension of the inner spring 51 so, that the highest pressure for fully loaded wagons can be limited f. e. to 3.5 atmospheres, for empty wagons to 1.8 atmospheres and for half loaded wagons to a convenient intermediate highest pressure. The pressures at all intermediate grades of braking action are altered accordingly. The speed of the braking action can be regulated by the cock 58, the Fig. 3 shows for instance the position for slow braking by the narrow channel 55.

The ruling valve according to Fig. 4 is fundamentally similar to that according to Fig. 3, but of a simpler design. All parts received the same corresponding numerals, as in Fig. 3, and the action is exactly the same. In the atmospheric outlet 47 of this ruling valve a further nonreturn valve 63 with a spring 64 is provided, to prevent at braking position, i. e. at opened atmospheric outlet, the admission of dust or other undesirable bodies into the ruling valve and the brake cylinder.

I claim:

1. A brake of the one line type, comprising in combination a brake pipe, a brake cylinder, a principal air reservoir, an auxiliary air reservoir, a leaders valve, a ruling valve, a hollow spindle inside said leaders valve and a hollow spindle inside said ruling valve, both spindles being axially movable by regulating means, double valves inside both hollow spindles, one cone of said double valves governing an air inlet, the other cone governing an atmospheric outlet against a seat influenced by the air pressure, which has to be regulated.

2. A brake of the one line type, comprising in combination a brake pipe, a brake cylinder, a principal air reservoir, an auxiliary air reservoir, a leaders valve, a ruling valve, a leaders handle on said leaders valve, a screw like part, said handle being movable on said screw like part, a hollow spindle, a double valve inside said spindle, a brake pipe chamber, one cone of said double valve governing an air inlet to said chamber, an atmospheric outlet, a valve seat on said outlet, the other cone of the double valve governing said outlet against said seat, said seat being influenced by the air pressure in said chamber and a spring.

3. A brake of the one line type, comprising in combination a brake pipe, a brake cylinder, a principal air reservoir, an auxiliary air reservoir, a leaders valve, a ruling valve, a leaders handle on said leaders valve, a screw like part, said handle being movable on said screw like part, a hollow spindle, a double valve inside said spindle, a brake pipe chamber, one cone of said double valve governing an air inlet to said chamber, an atmospheric outlet, a valve seat on said outlet, the other cone of the double valve governing said outlet against said seat, said seat being influenced by the air pressure in said chamber and a spring, borings in said hollow spindle, said seat of said atmospheric outlet extending in the shape of a pipe into said hollow spindle.

4. A brake of the one line type, comprising in combination a brake pipe, a brake cylinder, a principal air reservoir, an auxiliary air reservoir, a leaders valve, a ruling valve, a hollow spindle in said ruling valve, a piston like member in said ruling valve, said spindle being fastened to said piston like member, a spring loading one side of said member, and a chamber of equal air pressure, said pressure loading the other side of said member.

5. A brake of the one line type, comprising in combination a brake pipe, a brake cylinder, a principal air reservoir, an auxiliary air reservoir, a leaders valve, a ruling valve, a hollow spindle in said ruling valve, a piston like member in said ruling valve, said spindle being fastened to said piston like member, a spring loading one side of said member, and a chamber of equal air pressure, said pressure loading the other side of said member, an atmospheric outlet, a valve seat on said outlet, a second piston like member, said outlet being fastened to said second member, a spring loading one side of said second piston like member, a part with screw thread, said part supporting said spring so, that the spring tension can be altered and the braking action hereby regulated.

6. A brake as claimed in claim 4, including also a chamber connected with said hollow spindle, two channels connecting said chamber with the brake cylinder and a cock, which can alternatively open or throttle one or the other of said channels so as to regulate the braking velocity.

7. A brake consisting of all parts named in claim 4, 5 or 6 and furthermore of a nonreturn valve in said hollow spindle, preventing an air back stream from said brake pipe, a space inside said hollow spindle between said nonreturn valve and said double valve, a chamber leading to said auxiliary air reservoir and borings in said spindle, connecting said space inside the spindle with said chamber.

8. A brake consisting of all parts named in claim 4, 5, 6 or 7 and furthermore of a second nonreturn valve in said atmospheric outlet, preventing the admission of dust or other undesirable bodies into said ruling valve and said brake cylinder.

In witness whereof I affix my signature.

IWAN TROFIMOFF.